April 11, 1950     A. S. B. SCOTT     2,503,566
FLUID FILTER
Filed Nov. 5, 1948
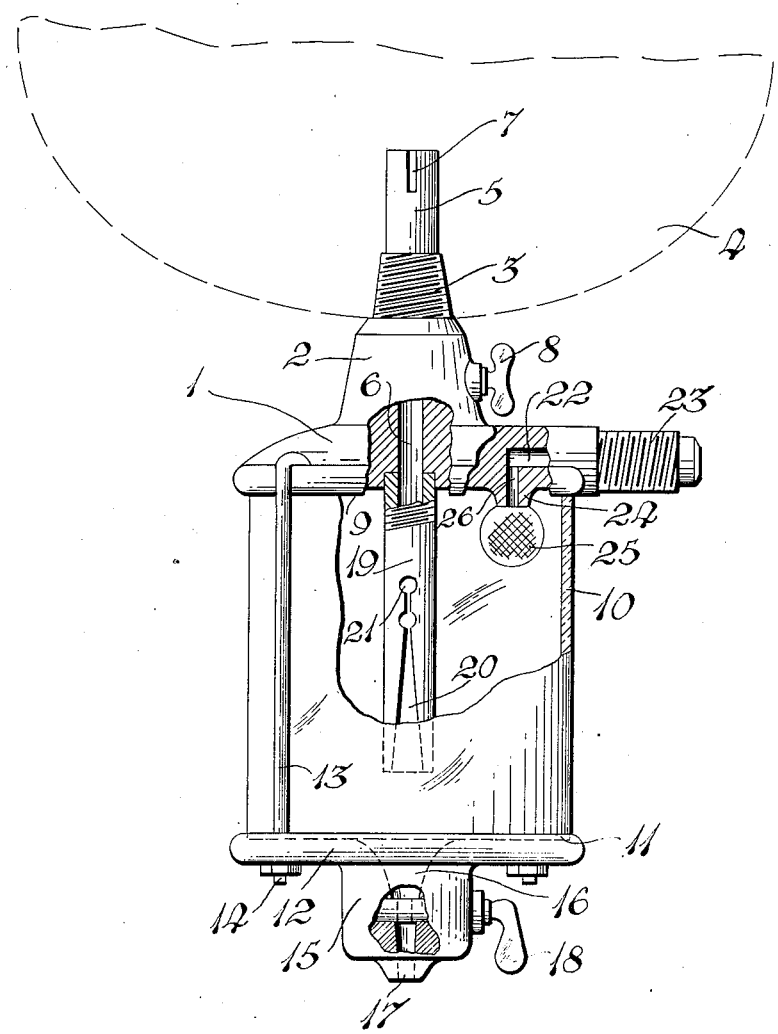
Inventor:
Albert S.B. Scott.
By: Outerdorhough &Co
his Atty's.

Patented Apr. 11, 1950

2,503,566

UNITED STATES PATENT OFFICE 2,503,566

FLUID FILTER

Albert S. B. Scott, Cupar, Saskatchewan, Canada

Application November 5, 1948, Serial No. 58,485

1 Claim. (Cl. 210—165)

My invention relates to new and useful improvements in fluid filters, an object of the invention being to provide a device of the character herewithin described in which the sump of the filter can be cleaned and flushed without dismantling.

A further object of my invention is to provide a device of the character herewithin described which includes means whereby relatively large obstructions can be displaced without the necessity of dismantling the filter.

Another object of my invention is to provide a device of the character herewithin described which includes means for reducing the risk of total blockage occurring at the outlet of the tank as will hereinafter be described.

A still further object of my invention is to provide a device of the character herewithin described which includes an inlet pipe so situated as to direct foreign matter, which may be contained in the fluid, towards the base of the sump.

A still further object of my invention is to provide a device of the character herewithin described whereby the filtering element may be kept clear of foreign matter by the self-cleaning action of the fluid passing therethrough.

Another object of my invention is to provide a device of the character herewithin described which is rugged in construction, economical in manufacture, and particularly suited for use with relatively heavy vehicles, being designed primarily to be installed directly to the fuel tanks thereof.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which the single figure is a side elevation of my filter sectioned in part to show the interior thereof.

Considerable difficulty has been experienced in the past in providing a fluid filter, suitable for use with relatively heavy vehicles such as farm tractors and the like, which will deal successfully with relatively coarse foreign matter as well as the finer particles normally found in the present day internal combustion engine fuels. General conditions on the farm do not lead to the efficient storage and protection of these fuels, it being normal to replenish the tanks of tractors and the like with fuel contained in cans which may or may not be carried by the tractor, and it has been found that the conventional filter incorporating a very fine mesh screen, regularly becomes clogged and inoperative due to the large amount of interfering material present in the fuel and tanks of farm vehicles.

Consequently I have designed the filter hereinafter to be described which, in this embodiment, is adapted to be attached directly to the tank of the vehicle and which includes means whereby the heavier foreign matter may be separated out by gravity, the screen being used for the filtering of the relatively light particles.

Proceeding therefore to describe my filter in detail, it will be seen upon reference to the accompanying drawing to comprise the main body 1 having a circular configuration and being provided with the upstanding centrally disposed shoulder 2 which in turn is surmounted by the screw threaded tapered portion 3 by which the filter may be attached to the underside of the associated tank 4 in the conventional manner. The stand pipe 5 extends upwardly from the screw-threaded portion 3 within the associated tank 4, in the manner shown in the figure of the accompanying drawings, in order to prevent the introduction into the filter of any scale and the like which may be present in the lower part of the tank. The centrally disposed, longitudinally extending inlet drilling 6 is provided through the aforementioned shoulder and stand pipe to communicate with the filter body as hereinafter to be described. In this connection, it should be noted that the upper portion of the stand pipe is provided with the four notches 7 in order to prevent total blockage of the stand pipe taking place in the event of a relatively large obstruction occurring. The pet cock 8 is provided transversely within the shoulder 2 in order to control the flow of fuel from the tank to the filter it being provided with the conventional on-off positions.

The under surface of the body 1 of the filter is provided with an annular rim 9 adapted to receive the cylindrical filter housing or sediment bowl 10 manufactured preferably from glass or transparent plastic. The lower portion of the bowl 10 is receivable into the corresponding annular rim 11 provided in the sump or base body portion 12 of the filter and it should be noted at this point that conventional cork sealing washers may be provided at the junction of the glass bowl to the top and bottom body portions. Clamping rods 13 engage with the top and bottom body portions and are provided with the tightening means 14 in the form of nuts or the like in order to maintain the filter components assembled. The centrally disposed shoulder 15 is provided on the underside of the lower body portion 12 and contains the upwardly flared aperture 16 communicating between the bowl 10 and the drain 17, being provided with the transversely situated petcock 18 in order that the contents of the bowl 10 may be discharged as required. The flared aperture 16 together with the drain 17 and the petcock 18 are designated as the sediment discharge valve in the appended claim.

The under surface of the upper body portion 1 is recessed around the inlet pipe 6 and screw-threaded to receive the open-ended dispersion pipe 19 which extends downwardly within the bowl 10 of the filter to a position superjacent the sediment discharge valve. The lower end of this pipe is divergently bifurcated as shown by reference character 20 which assists materially in the depositing of the heavier foreign matter within the discharge valve without turbulence occurring from the incoming jet of fuel, as it will be appreciated that the pressure is dispersed as soon as the fuel passes the uppermost end 21 of the bifurcation. The upper portion 1 of the filter body is provided with the discharge aperture 22 communicating with the screw-threaded union 23 to which may be attached a conventional conduit leading to the carburettor of the engine. The relatively small shoulder 24 situated on the under side of the top body portion is provided with the thimble filter 25 through which the fluid passes and is connected to the aforementioned discharge aperture 22 by means of the vertical drilling 26.

Having therefore described my invention in detail its method of application will now be presented.

Under normal running conditions the petcock 8 is turned on and fluid flows via gravity through the inlet pipe 7 to the dispersion pipe 19 and thence to the sediment bowl 10, the heavier foreign matter being deposited by gravity within the sump 16 in the normal manner. When the bowl is full, fluid then flows via the thimble filter 25 to the discharge aperture 22 and thence to the carburettor, the thimble filter straining the relatively fine particles from the fuel and remaining in a relatively clean condition due to the vibration and movement of the fuel therethrough. When it is desired to drain the sump 16 the pet cock 18 should be turned thus allowing a quantity of fuel to drain from the bowl through the sump and to the drain 17 carrying away with it any foreign matter deposited within the sump. It will be noted that the top of the bowl 10 is in vertical linear alignment with the tank 4 and that the sediment discharge valve is in vertical alignment with the dispersion pipe 19. Thus, in the event of a relatively large obstruction occurring within the inlet pipe 6, the pet cock 18 may be turned to the "on" position and a stiff wire inserted through the drain, through the dispersion pipe and into the tank thus removing the obstruction and allowing the free passage of fuel therethrough, giving what I designate as a concentric axial run-through to the filter.

Since various modifications can be made in my invention as hereinbefore described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A fluid filter for a gasoline tank and the like comprising in combination a cylindrical sediment bowl in communication with said tank, said bowl being in vertical linear communication with said tank at the top of the former, a divergently bifurcated and open-ended dispersion pipe extending downwardly into said bowl, drillings in the apical region of said pipe in vertical alignment with the axis of said vertical linear communication between said bowl and said tank, a stand-pipe extending upwardly into said tank from the cover of said bowl, said cover being apertured concentrically with said stand-pipe and said dispersion pipe in vertical alignment therewith, a discharge aperture being provided in the upper region of said bowl, the axial run-through of said stand-pipe, said dispersion pipe, and said discharge valve being concentric.

ALBERT S. B. SCOTT.

REFERENCES CITED

The following references are of record in the file of this patent:

UNITED STATES PATENTS

| Number | Name | Date |
| --- | --- | --- |
| 535,167 | Kotz | Mar. 5, 1895 |
| 1,040,283 | Crum | Oct. 8, 1912 |
| 1,062,236 | Hitchcock | May 20, 1913 |
| 1,746,274 | Otis | Feb. 11, 1930 |